June 14, 1927.
R. A. ASHTON
1,632,018
WORK DRIVING DEVICE
Filed June 8, 1925
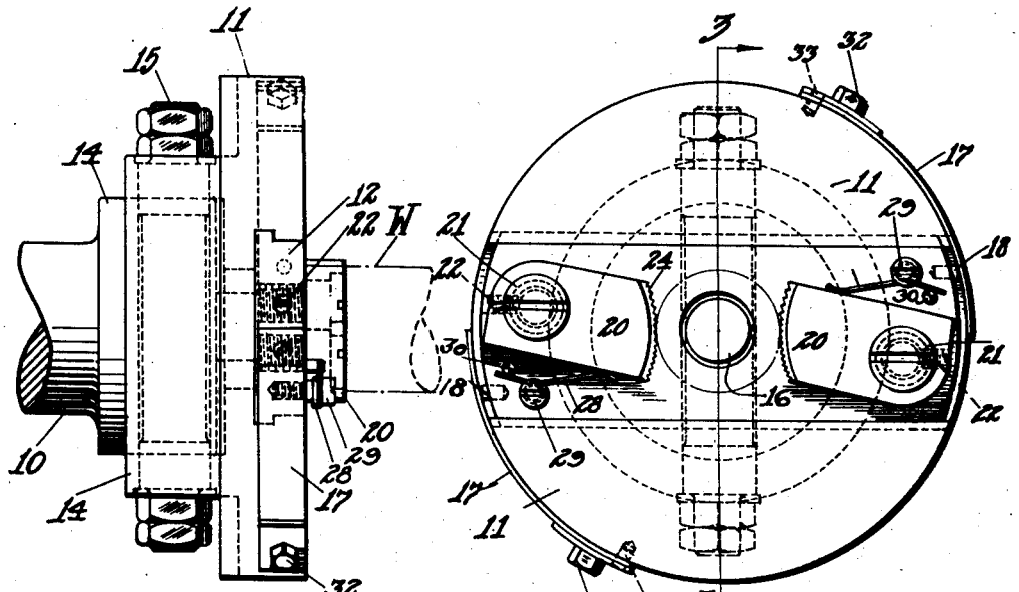
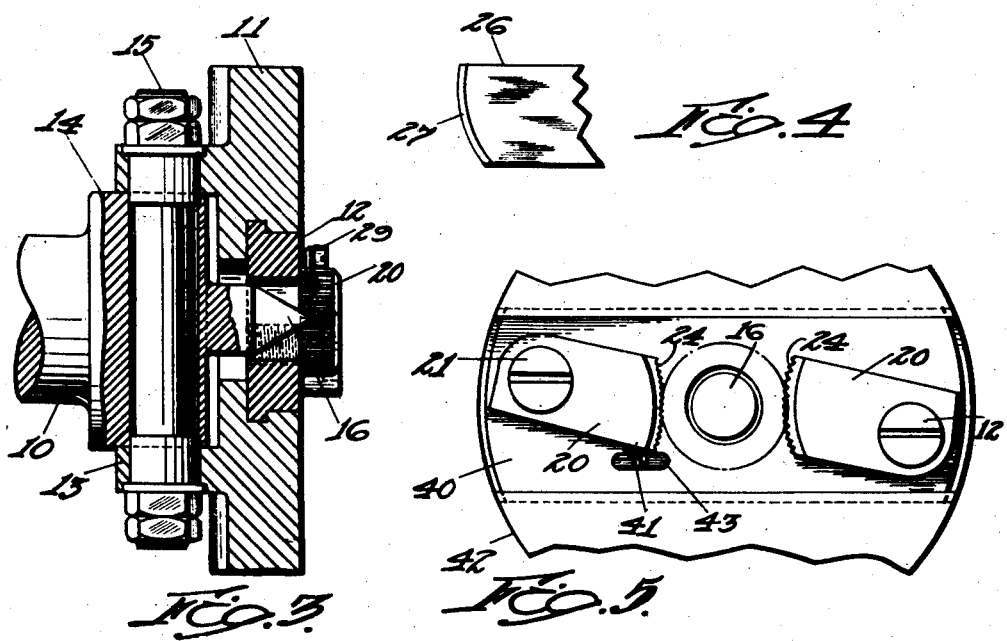
Inventor:
Richard A. Ashton
by Attorneys
Southgate Fay & Hawley Patented June 14, 1927.

1,632,018

UNITED STATES PATENT OFFICE.

RICHARD A. ASHTON, OF SENECA FALLS, NEW YORK, ASSIGNOR TO SENECA FALLS MACHINE CO., OF SENECA FALLS, NEW YORK, A CORPORATION OF MASSACHUSETTS.

WORK-DRIVING DEVICE.

Application filed June 8, 1925. Serial No. 35,544.

This invention relates to a work driving device for use on lathes, cylindrical grinders, and any other machines in which cylindrical work is rotated upon centers.

It is the object of my invention to provide a driving device by which the work is automatically engaged and in which the driving pressure is equally applied at opposite sides of the work.

With this general object in view, an important feature of my invention relates to the provision of a pair of work driving dogs mounted upon a cross slide which permits automatic radial adjustment of the dogs to equalize the driving pressure thereof.

Other features of the invention relate to certain arrangements and combinations of parts which will be hereinafter described and more particularly pointed out in the appended claims.

A preferred form of the invention is shown in the drawings, in which

Fig. 1 is an end elevation of my improved work driving device;

Fig. 2 is a front elevation thereof;

Fig. 3 is a sectional elevation, taken along the line 3—3 in Fig. 1;

Fig. 4 is a detail view, showing a slight modification of the jaw, and

Fig. 5 is a partial end elevation, showing an additional modification.

Referring particularly to Figs. 1, 2 and 3, I have shown my work driving device as applied to the spindle 10 of a lathe or some other similar machine. The device comprises a head 11 secured to the end of the spindle 10 and having a cross slide 12 mounted for transverse movement in guideways in said head.

The head 11 may be secured to the spindle 10 in any convenient manner and is shown herein as having a hub portion 13 extending rearwardly and closely fitting an enlarged end portion 14 of the spindle 10. A locking stud 15 extends transversely through the hub 13 and the end portion 14 and secures the head firmly to the end of the spindle 10. Any other suitable or convenient arrangement for firmly securing the head to the spindle may be substituted for that shown in the drawings.

I have also indicated the spindle 10 as having a center 16 formed at the end thereof or carried thereby and extending through the driving head 11 and slide 12, which parts are provided with enlarged openings through which the center projects.

The slide 12 is centered in the head 11 by a pair of arc-shaped flat springs 17 secured to the outer surface of the head 11 and engaging studs 18 projecting from the opposite ends of the slide 12. The springs 17 thus act to yieldingly center the slide 12 in the head 11 but permit the slide to be yieldingly displaced from its normal central position.

A pair of work driving dogs 20 are mounted upon studs 21 fixed in the outer face of the slide 12. These studs 21 are preferably threaded into the slide and may be locked in position by binding screws 22. The dogs 20 are provided with eccentric arc-shaped, work-engaging faces 24, which are shown in Fig. 1 as having teeth or serrations thereon. In Fig. 4 I have indicated a similar dog 26 having a smooth eccentric face 27.

A spring 28 for each dog 20 or 26 is centered on a stud 29 in the slide 12 and has an end portion engaging a second stud 30 in the slide 12. These springs act to yieldingly press the dogs toward the work, as clearly shown in Fig. 1. The springs 17 are secured to the head 11 by screws 32 and may also be provided with studs 33 for preventing angular displacement thereof.

Having thus described the construction of my improved work driving device, the operation thereof is as follows: The work W is inserted upon the head center 16 and upon a tail center (not shown) in the usual manner. When thus inserted, the dogs 20 yieldingly and automatically engage the work and the slide 12 adjusts itself transversely so that the dogs engage with equal pressure upon each side of the work.

In Fig. 5, I have indicated a slight modification in which the springs 17 are omitted, so that the slide 40 is free to move radially, but such radial movement is limited by a stud 41 fixed in the head 42 and extending through a slot 43 in the slide 40. The operation of this construction is substantially identical with that previously described, except that the cross slide is free to move instead of being yieldingly centered.

Having thus described my invention, it will be seen that I have provided an extremely simple work driving device which automatically engages the work without at- tention by the operator, and which also automatically equalizes the pressure on opposite sides of the work.

Having thus described my invention and the advantages thereof I do not wish to be limited to the details herein disclosed otherwise than as set forth in the claims but what I claim is:—

1. A work driving attachment comprising a head, a transverse guide thereon, a slide movable in said guide, and a pair of work engaging dogs pivotally mounted thereon, said dogs being mounted for independent movement upon their separate pivots and for simultaneous movement on said head in one direction to equalize the driving pressure of the dogs on the work.

2. A work driving attachment comprising a head, a guideway transversely thereof, a cross slide mounted for movement in said guideway, and a pair of dogs mounted in spaced relation on said slide, said dogs having cam faces and being yieldingly moved to work engaging position.

3. A work driving attachment comprising a head, a guideway transversely thereof, a cross slide mounted for radial movement in said guideway, means to yieldingly maintain said cross slide in normal central position, and a pair of driving dogs pivoted on said slide and having eccentric work engaging faces.

4. A work driving attachment comprising a head having a transverse guideway therein, a cross slide mounted to slide radially in said guideway, a pair of springs mounted on said head to engage said slide and yieldingly resist displacement thereof, and a pair of work engaging dogs pivoted on said cross slide.

5. A work driving attachment comprising a head having a guide means transversely thereof, a slide mounted for movement on said head in cooperation with said means, and a pair of dogs movably mounted on said slide for automatic adjustment to the work introduced.

In testimony whereof I have hereunto affixed my signature.

RICHARD A. ASHTON.